United States Patent [19]

Henderson

[11] 4,081,152
[45] Mar. 28, 1978

[54] DUAL TENSION RETRACTOR

[75] Inventor: Cyril Henderson, Woodland Hills, Calif.

[73] Assignee: American Safety Equipment Corporation, Encino, Calif.

[21] Appl. No.: 635,413

[22] Filed: Nov. 26, 1975

[51] Int. Cl.$^2$ .................. A62B 35/00; B65H 75/48
[52] U.S. Cl. ........................... 242/107; 242/107.4 R
[58] Field of Search ............ 242/107.6, 107.7, 107.12, 242/107.2, 107, 107.4 R, 107.4 E; 297/388; 280/744

[56] References Cited

U.S. PATENT DOCUMENTS

| | | | |
|---|---|---|---|
| 3,598,335 | 8/1971 | Seeger | 242/107.7 X |
| 3,851,836 | 12/1974 | Sprecher | 242/107.7 |
| 3,858,826 | 1/1975 | Sprecher | 242/107.7 |
| 3,957,222 | 5/1976 | Bladh | 242/107.4 R |

*Primary Examiner*—Harvey C. Hornsby
*Assistant Examiner*—John M. Jillions
*Attorney, Agent, or Firm*—Poms, Smith, Lande & Glenny

[57] ABSTRACT

Tension relieving means for safety belt retractors having biasing means for normally biasing an associated safety belt storage means toward a belt retracted condition when the associated safety belt is protracted are provided for restricting the retractive movement of the storage means when the belt is in use to provide a limited low tension travel for the belt which is automatically established on a slight retractive movement of the protracted belt and is maintained within the limits of a predetermined extent of low tension travel for the belt. Pawl means are pivotally mounted on a lower end of a tension arm pivotally mounted to the retractor frame having a free end roller engaging laterally against protracted portions of the webbing with a belt storage reel associated ratchet wheel adapted to be selectively engageable with the pawl whereby the retractive force of the biasing means for the belt storage means is reacted through the ratchet wheel, pawl means and tension arm with a mechanical lever disadvantage such that a resultant low tension retractive effect is applied to the belt automatically when the belt is placed into use.

16 Claims, 7 Drawing Figures

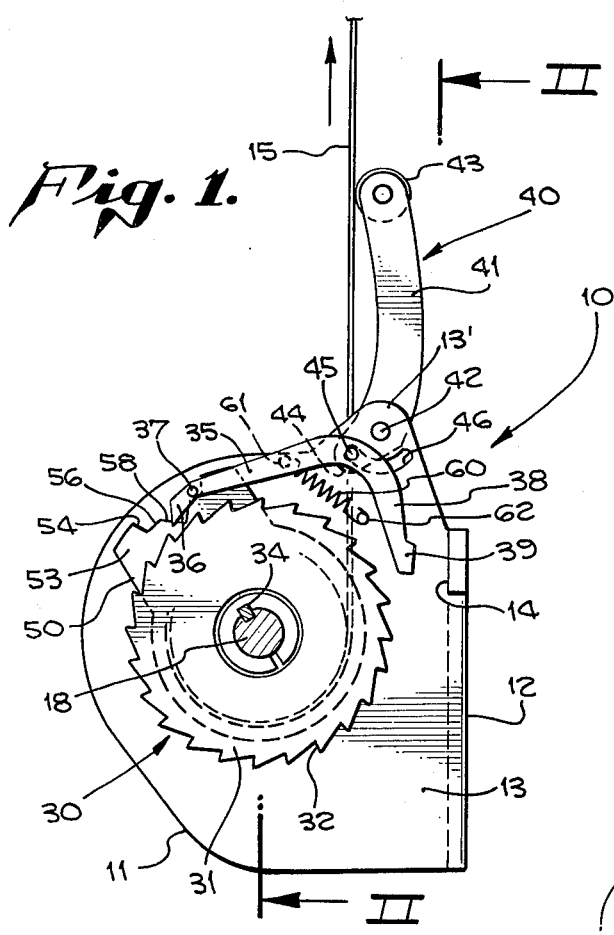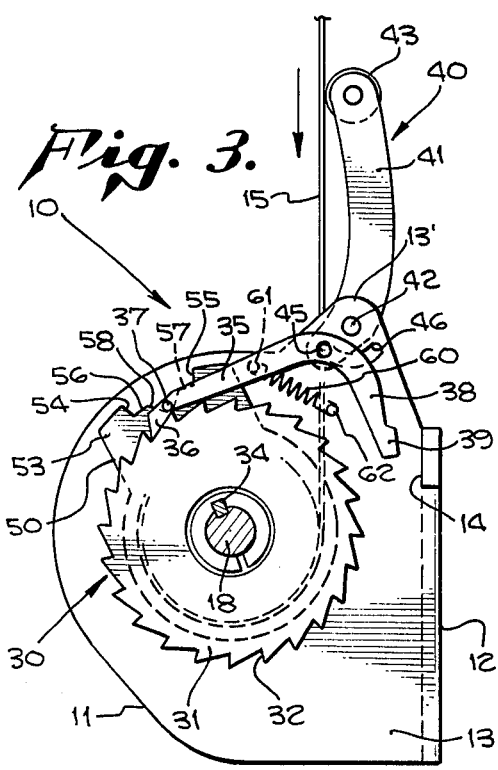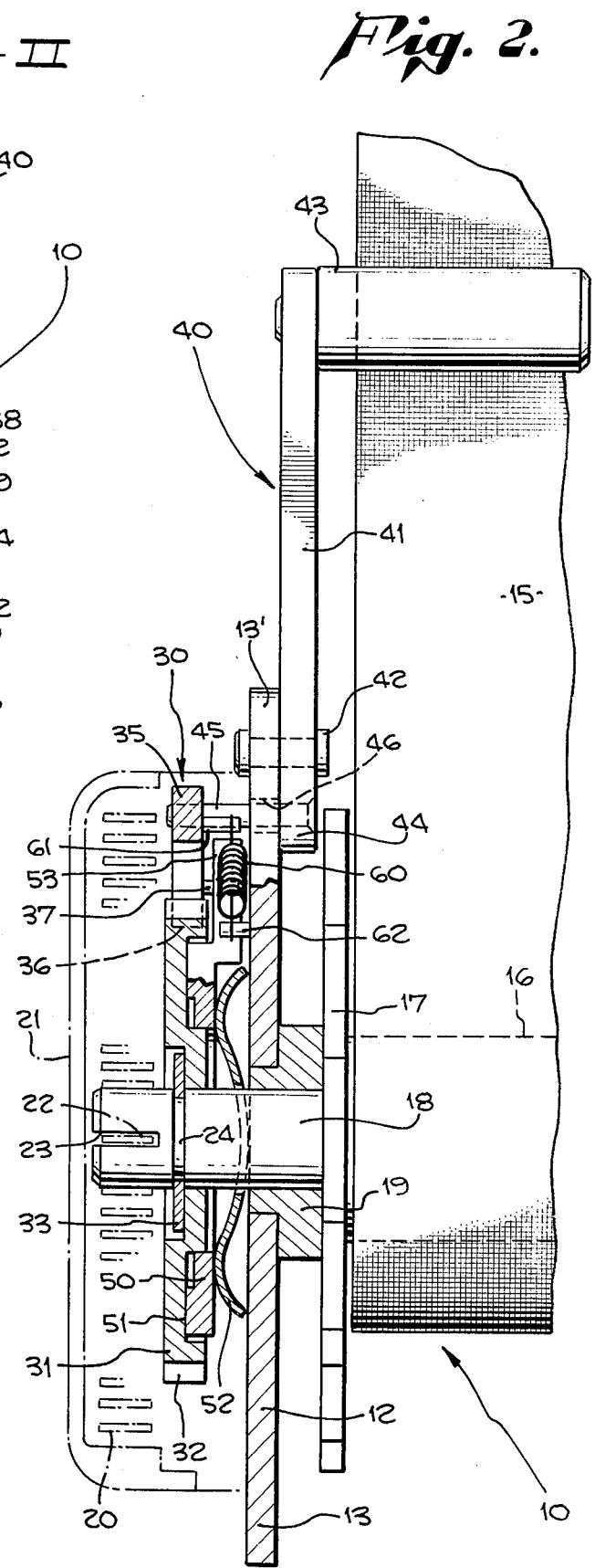

4,081,152

DUAL TENSION RETRACTOR

BACKGROUND OF THE INVENTION

This invention relates generally to tension relieving or reducing means for safety belt retractors which have a biasing means for normally biasing the associated safety belt storage means toward a belt retracted condition when the belt is protracted, as when placed in condition for use as part of a vehicle associated safety harness. More specifically, the present invention relates to a tension relieving means which restricts the biasing force of the belt storage means biasing means from acting fully upon the belt when in use so that the single biasing means of the retractor is employed for normal belt retractive operations as well as supplies the mode of force for a reduced tension travel of the belt when in use.

Safety belt retractors are in general use in vehicles in association with safety belt and safety harness arrangements wherein a portion of the harness or an associated safety belt passes across the upper torso of the passenger. In order to promote convenient and comfortable use of such belt, when in use, it is desirable to provide a means for reducing the tension otherwise effected in the belt due to the presence of the retractor rewind or retraction biasing means which generally comprises a retractor spring associated with the belt reel. Prior attempts at reducing the tension of the retractor spring acting upon the belt when the latter is in use have included the mounting of adjustable clips on the belt which abut stationary fittings mounted to the vehicle seat to allow the passenger to adjust the clip into a position where it will abut the seat associated fitting and thus absorb the force of the retractor spring. However, such clips are not easily used and can allow a dangerous slack webbing condition to exist. Other approaches have provided manually manipulable means for locking the retractor against retraction, but which have the same potential dangerous condition of slack webbing.

Other tension relieving devices associated with safety belt retractors heretofore have provided one or more frictionally driven camming discs associated with pawl means for selectively preventing reel retraction in response to various manipulated movements of the belt. However, when the retractor reel is held in a stationary condition by such associated pawl means, additional means must be provided to create a low tension on the belt if a slack condition for the belt is to be avoided.

SUMMARY OF THE INVENTION

It is a primary object of the present invention to disclose and provide a tension relieving means for safety belt retractors wherein a low tension mode of travel for the safety belt may be provided automatically in response to the normal manipulation of the belt in its being placed in use by a vehicle passenger using the same and wherein the low tension mode is accomplished under the bias of the single biasing means normally provided in the retractor for retracting the belt.

It is another object of the present invention to disclose and provide a tension relieving means as in the foregoing object wherein means are provided for restricting the retractive movement of the belt storage means to provide a reduced tension on the belt due to the continuing, though restricted biasing effect of the belt storage means associated retraction spring or biasing means.

Generally stated, the present invention in tension relieving means comprises the provision of means for restricting retractive movement of the retractor associated storage means to provide a reduced tension on the belt due to the biasing means of the retractor and means for automatically operating the restricting means to a restricted condition upon a slight retraction of the belt following a protraction thereof. The latter means is also provided for deactivating the restricting means automatically upon a protraction or retraction of the belt of an amount beyond the limits of a predetermined extent of low tension travel for the belt.

More specifically, the tension relieving means of the present invention includes the provision of tension arm means pivotally mounted to the retractor with a belt contacting end positioned to laterally engage protracted portions of the belt and has an opposite pawl mounting end. A pawl means is pivotally mounted to the tension arm means on the pawl mounting end. Ratchet means are associated with the belt storage means for movement therewith under the action of the associated biasing means and means are provided for operating the pawl means into engagement with the ratchet means in response to a slight retractive movement of a protracted belt whereby the biasing force of the retractor biasing means is reacted through the ratchet means and pawl to the pawl mounting end of the tension arm to pivot the latter into a lateral belt contacting engagement with protracted portions of the webbing. The lever arm of the force of the pawl means acting on the tension arm around the latters pivotal axis relative to the lever arm of the belt engaging portion of the tension arm relative to its pivotal axis is provided to give a mechanical disadvantage to the input force of the retractor biasing means so that a resultant lower or reduced tension effect is provided on the belt.

A more complete understanding of the tension relieving means of the present invention, as well as a realization of the various advantages and objectives of the present invention will be afforded to those skilled in the art from a consideration of the following detailed description of a preferred exemplary embodiment thereof. Before beginning such detailed description, however, a brief description will be given of the appended sheets of drawings illustrating the preferred embodiment of dual tension retractor employing the exemplary embodiment of tension relieving means.

BRIEF DESCRIPTION OF THE DRAWINGS

FIG. 1 is a side elevational view of an exemplary embodiment of tension relieving means for safety belt retractors in accordance with the present invention with the associated covering housing and retraction spring removed for clarity;

FIG. 2 is a detail section view of the exemplary embodiment of tension relieving means of FIG. 1 taken therein along the plane II—II;

FIG. 3 is a view of the exemplary embodiment of tension relieving means of FIG. 1 showing the condition thereof on a slight retraction movement of the belt following the protractive movement illustrated in FIG. 1;

DETAILED DESCRIPTION OF THE PREFERRED EXEMPLARY EMBODIMENT

Figure 4:
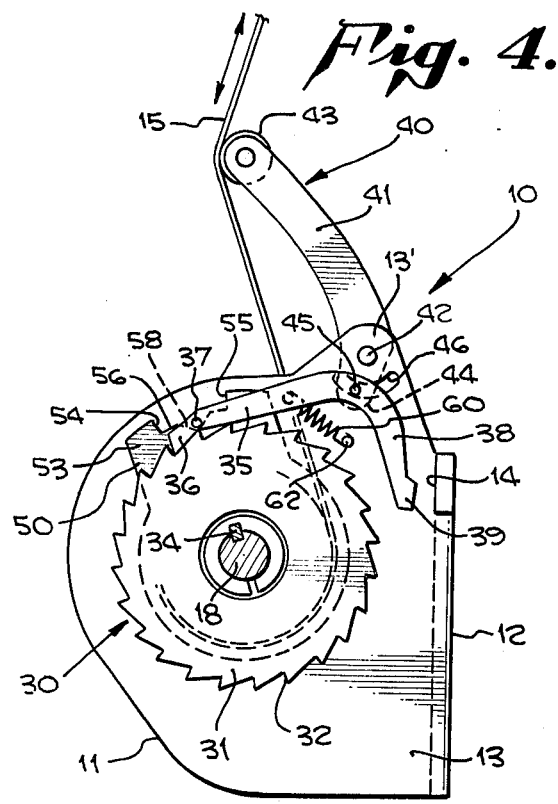
FIG. 4 is a view of the tension relieving means of FIGS. 1 and 3 showing the condition thereof with the tension relieving means operative and the safety belt being in a low tension condition in accordance with the present invention.

A detailed description of a preferred exemplary embodiment of tension relieving means for safety belt retractors having biasing means for normally biasing an associated belt storage means toward a belt retracted condition when the associated safety belt is protracted will now be made. Referring firstly to FIGS. 1 and 2, it should be understood by those skilled in the art that the within exemplary embodiment of tension relieving means may be employed with most any type of safety belt retraction mechanism, whether it be of the strap acceleration locking or vehicle inertia sensing locking, or other, type. Such otherwise conventional retractor is illustrated generally at 10 and includes a generally U-shaped frame 11 including a base 12 and a pair of opposed side walls, side wall 13 being seen in FIGS. 1 and 2. The retractor frame 11 may be mounted to the vehicle frame in conventional manner to place the associated safety belt 15 in position to be drawn from the retractor and placed in use about the passenger with associated conventional buckling means. An exemplary retractor in which the present tension relieving means may be employed is illustrated in the co-pending application for U.S. Pat. Ser. No. 627,875 filed Oct. 31, 1975 and owned by the assignee of the within application. The disclosure of retractor mechanism of said U.S. application Ser. No. 627,875 is incorporated herein by this reference.

As seen in FIG. 2, the safety belt 15 is wound upon a reel 16 in the exemplary embodiment which has a pair of conventional end locking ratchets, ratchet 17 being illustrated in FIG. 2. Reel 16 is provided with a reel shaft at either end for mounting by appropriate bushings into the retractor side walls, the end shaft 18 being illustrated in FIG. 2 mounted within the associated bushing 19 fitted to wall 13. Conventional retractor locking means, not illustrated, may be employed for locking against the ratchet wheels as wheel 17, to prevent protraction of the belt under emergency conditions.

Conventional biasing means are provided in the exemplary retractor for normally biasing the belt storage reel 16 toward a retracted or belt wound condition. In the exemplary embodiment, such biasing means comprise the provision of a conventional retraction spring 20 having one end fixed to a conventional housing 21 secured to wall 13. The free or acting end 22 of the retractor spring 20 is fitted into a slot 23 provided in the end of shaft 18 in order to normally bias the belt storage means, comprising reel 16, toward a belt stored condition as seen in FIG. 2. Shaft 18 is provided with a ring groove 24 for receiving snap ring 33 as subsequently described.

As is particularly contemplated within the present invention, tension relieving means are provided for restricting the retractive movement of the belt storage means to provide a reduced tension on the belt during use by the passenger. As is well known in the art, when the safety belt 15 is employed as a chest belt as part of a safety harness, by way of example, the tension applied to the belt by the biasing means, comprising the retractor spring 20, can produce an unpleasant tightening of the belt across the passengers chest. The tension relieving means of the present invention is intended to reduce the tensioning effect of the retractor spring 20 and provide for a limited extent of low tension travel for the belt when it is placed in use so that the passenger may move around normally with an automatically resetting low tension safety belt restraint.

In accordance with the present exemplary embodiment, means for restricting retractive movement of the belt storage means to provide a reduced tension on the belt otherwise due to the biasing means of spring 20 comprise the provision of a force transmitting means indicated generally at 30 and comprising ratchet wheel 31, pawl means 35 selectively engagable with the ratchet wheel 31 and tension arm means, indicated generally at 40, adapted to laterally engage portions of the protracted webbing 15 via end contact roller 43. As will be subsequently explained in detail, when the exemplary embodiment of tension relieving means is operated, the force of the biasing means (spring 20) reacts through wheel 31, pawl means 35 and tension arm means 40 into a lateral force against the belt 15 in its protracted portions with the mechanical leverage being such that an overall reduced tension effect is provided for the belt.

As seen in FIG. 1, the force transmitting means, indicated generally at 30, comprises a ratchet wheel 31 having a plurality of ratchet teeth 32 facing in a direction opposite to the direction of rotation of shaft 18, to which it is keyed, during protraction of the belt. A spring washer 33 (FIG. 2) which fits into shaft ring groove 24 is provided to prevent ratchet wheel 31 from moving axially off of shaft 18 to which it is keyed by the key member 34 (FIG. 1). Wheel 31 therefore rotates with the rotational movement of storage means 16 in response to movement of the belt 15 in a protraction or retraction mode.

Pawl means 35 are provided for engaging the individual teeth of ratchet wheel 31 to receive the force of the biasing means acting through reel 31 and transmitted on to the tension arm means indicated generally at 40. As seen in FIG. 1, pawl means 35 includes a first end forming a pawl tooth 36 adapted to engage with any one of the teeth 32. A cam pin 37 is provided on pawl 35 for interengagement with a frictionally driven disc means 50 for selectively allowing engagement between the pawl means and wheel 31 during protraction and retraction movement of the belt as subsequently described. Pawl means 35 also is provided with an oppositely extending arm or tail portion 38 which terminates in an abutment portion or pad 39, the function of which will become apparent subsequently. Importantly, pawl means 35 is, in accordance with the present invention, movably mounted upon the tension arm means in a manner to transmit the force it receives from the biasing means 20 to the tension arm means indicated generally at 40. In the exemplary embodiment, as seen in FIG. 1, pawl means 35 is pivotally mounted at an approximate mid portion thereof on a mounting or support pivot pin 45 fixed to the tension arm means which will now be described.

Means are provided in accordance with the present invention for reacting against the protracted portions of the belt to provide a secondary storage or retraction of webbing under a low tension condition which act from the single biasing means of the retractor which normally comprises a conventional retractor spring 20. As seen in FIGS. 1 and 2, the exemplary embodiment of tension arm means for accomplishing this purpose is indicated generally at 40 and comprises an arm 41 pivotally mounted by pivot pin 42 to an upstanding portion 13' of retractor side wall 13. Means are provided on arm 41 for laterally contacting or engaging against the belt 15 and, in the exemplary embodiment, comprise a roller 43 pivotally mounted to arm 41. The tension arm means, indicated generally at 40, may also be provided in the form of a U-shaped member having a pair of pivoted arms, pivoted to the opposite sides of the retractor frame, with a roller spanning between the arms as in the aforementioned and incorporated application for U.S. Pat. Ser. No. 627,875. However, in accordance with the present invention, arm 41 is provided with an additional extension or depending portion 44 mounting the aforementioned support pin 45. In the present embodiment, arm 41 is mounted on an inner side of retractor side wall 13 with the pawl means 35 being mounted on an outer side thereof. Therefore, in the present embodiment an arcuate slot 46 is provided in side wall 13 to allow free movement of the support pin 45 relative to wall 13 under the action of pawl 35 and belt 15 on the tension arm means as will be described more fully hereinafter.

Means are provided in accordance with the present invention for automatically operating the tension reducing or restricting means to a restricting condition upon a slight retraction of the belt following a protraction thereof. As seen in FIGS. 1 and 2, a friction disc means 50 is rotatably mounted about shaft 18 with a reduced surface area 51 presented toward an inner surface of ratchet wheel 31. Friction disc means 50 is normally biased into a frictional drive engagement with wheel 31 by the associated spring washer 52 fitted between the friction disc means 50 and the outer surface of retractor wall 13. Friction disc means 50 is further provided with a pawl operating portion 53 which acts on pawl pin 37 to maintain the pawl disengaged from reel 31 during protraction as in FIG. 1 while allowing the pawl means 35 to engage wheel 31 during a slight retraction movement as seen in FIG. 3. The pawl operating portion 53 of the friction disc includes a pair of end stop surfaces 54 and 55 which co-operate with pin 37 to limit rotational movement of friction disc 50 during rotation of belt storage means 16 in response to belt movement. Further, a pair of pin contacting surfaces or lands 56 and 57 are provided in spaced relation on opposite sides of a center groove or notch 58. As seen in FIG. 1, on a protraction movement of belt 15, the belt storage means including reel 16 rotates in a counter clockwise direction which causes the associated friction disc 50 to also rotate in a counter clockwise direction, placing land 57 beneath pin 37 which also abuts the stop surface 55 preventing further rotation of the friction disc. However, on a slight retractive movement of belt 15, as seen in FIG. 3, the clockwise rotation of reel 16 and associated ratchet wheel 31 causes a slight clockwise rotation of the friction disc allowing pawl pin 37, acting as a follower, to cam down into the notch or groove 58 and a consequent engagement between pawl tooth 36 and one of the ratchet teeth 32. The movement of pawl 35 into engagement with ratchet wheel 31 may be allowed to occur by the force of gravity, should the orientation of the retractor in the vehicle allow the same, or, as seen in the exemplary embodiment, a pawl spring 60 may be provided to bias the pawl toward engagement with the ratchet wheel 31. The exemplary pawl spring 60 is shown extending between mounting pin 61 on the pawl and the associated mounting pin 62 secured to the retractor side wall 13. From the foregoing, it can be seen that on such slight retraction of the belt 15, as seen in FIG. 3, the tension restricting means of the present invention is operated.

On operation of the tension relieving means of the present invention, by a slight retractive movement of belt 15 as seen in FIG. 3, the biasing force of the retractor spring 20 is reacted into a low tension retraction effect upon belt 15 through wheel 31, pawl means 35 and the tension arm means indicated generally at 40. Since pawl means 35 is pivotally mounted on pin 45 on the lower extension 44 of tension arm 41, the biasing force of retractor spring 20 transmitted through ratchet wheel 31 and pawl means 35 reacts through the relatively short lever arm between the axis of tension arm pivot pin 42 and pawl means pivot pin 45 to cause counter clockwise rotation of tension arm 41 laterally against belt 15 through the relatively considerably longer lever arm existing between the point of contact of roller 43 on belt 15 and the pivotal axis at pin 42. Therefore, the reactive force laterally against belt 15 is reduced in proportion to the ratio of the respective lever arms such that a lower tension effect is produced on belt 15 by the single biasing means of spring 20 as long as pawl means 35 is in engagement with ratchet wheel 31.

Figure 5:
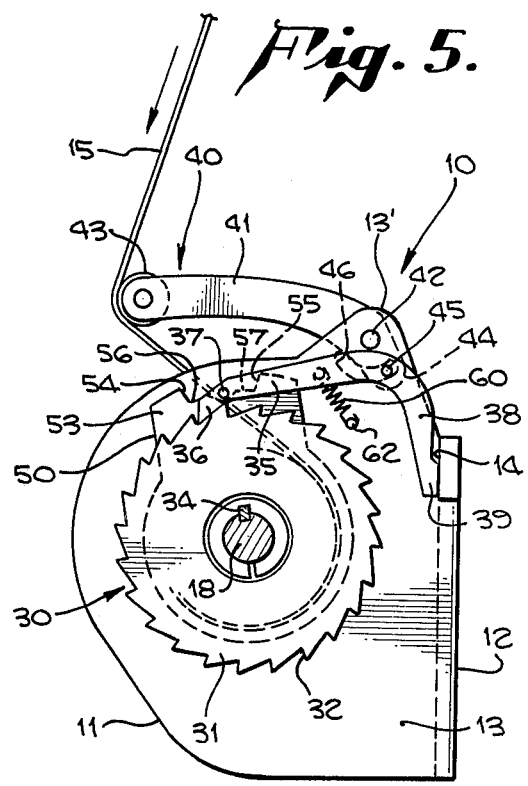
FIG. 5 is a view of the tension relieving means of FIG. 4 showing the condition thereof as the belt has traveled to a retractive limit of the extent of travel afforded in the low tension condition.
Figure 6:
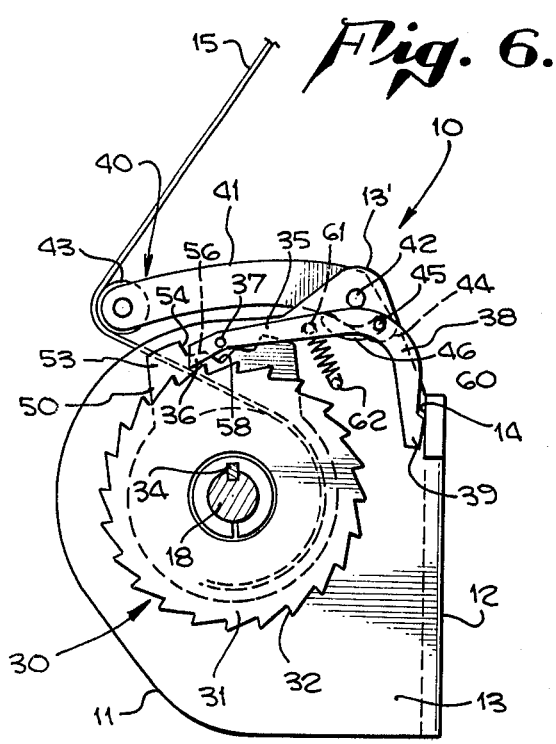
FIG. 6 is a view of the tension relieving means of FIG. 5 showing the condition thereof as the tension relieving means is deactivated.
Figure 7:
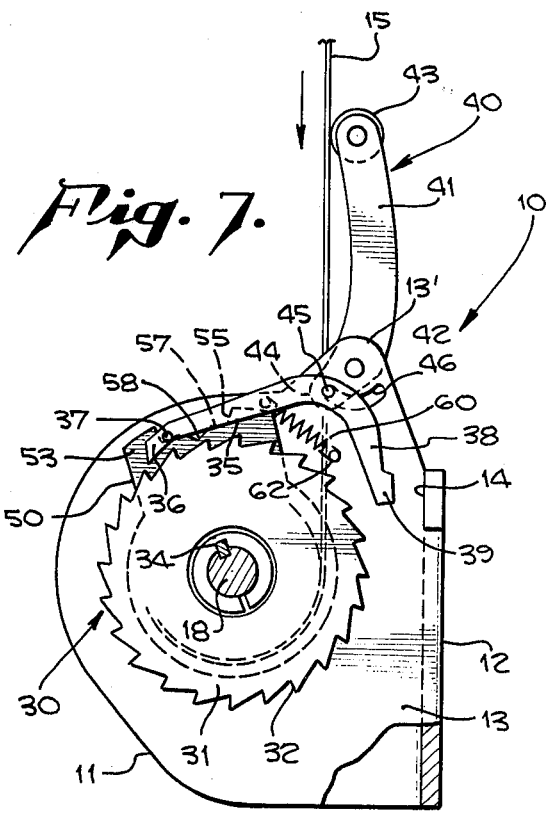
FIG. 7 is a view of the tension relieving means of FIG. 6 showing the condition thereof as the belt is retracted under the bias of the associated reel biasing means.

During the low tension mode of operation of the tension relieving means of the present invention, as seen in FIG. 4, the belt 15 is provided with a limited travel between the retractor positions of FIGS. 3 and 5. During this low tension, travel the ratchet wheel 31, friction disc 50 and pawl means 35 rotate in unison as the tension arm 41 moves counterclockwise from the initial position of FIG. 3 to the retractive limit of low tension travel illustrated in FIG. 5. The retractor condition illustrated in FIG. 4 shows a typical intermediate position for the tension relieving means during the low tension movement of belt 15 in retractive or protractive modes. However, when the belt retracts in the low tension mode sufficiently to allow arm 41 to reach the position of FIG. 5, it can be seen that the pawl means abutment pad 39 comes into contact with an inner surface 14 of retractor base 12 such that further slackening of belt 15 will cause, under the urging of the biasing means, pawl means 35 to pivot about abutment pad 39, as seen in FIG. 6, to cause release of tooth 36 from ratchet wheel 31. The condition of the tension relieving means illustrated in FIG. 6 is an instantaneous occurrence since the force of the biasing means on the storage reel will immediately cause the belt 15 to begin retracting and, due to the tension in the belt 15, cause the tension arm 41 to fly freely to the inactive position of FIG. 7. With a retractive movement of belt 15, the clockwise rotation of ratchet wheel 31 causes clockwise rotation of friction disc 50 to place the associated land 56 beneath pawl pin 36. Rotation of friction disc 50 is restricted in a clockwise direction due to the engagement between stop surface 54 and pin 36. Then, as seen in FIG. 7, the pawl means 35 is maintained out of engagement with ratchet wheel 31 and there is no force being transmitted through pawl means 35 acting on pin 45 to cause rotation of arm 41 against belt 15. Arm 41 thus presents no tensioning force or frictional dragging force against the belt 15 which is free to retract into the retractor frame on the storage means 16. The tension relieving means will remain in this inactive position until there is a subsequent protraction of belt 15 as illustrated in FIG. 1, with the sequence of operations illustrated between FIGS. 1 and 7 then being automatically reoccurring.

As can be seen from the foregoing, the tension relieving means of the present invention provides for a reduced tension effect upon the belt automatically by normal manipulation of the belt to place it into use by the passenger. When the passenger pulls the belt 15 from the retractor to place it into use, he automatically sets the tension relieving means into the position of FIG. 1. On buckling up of the safety belt, a slight retractive movement of the belt, under the retractive urging of the associated biasing spring 20, normally occurs and automatically sets the tension relieving mechanism into the operated condition of FIG. 3. A low tension condition for the belt is then effected during a predetermined limited extent of travel for belt 15 as seen in FIG. 4 and between the limits of the retractor and belt positions of FIGS. 3 and 5. Should the passenger protract or retract the belt beyond the limits of the positioning of the belt in FIGS. 3 and 5, the tension relieving means is automatically deactivated, but is also automatically reactivated on resetting the belt in any position of eventual use. Further, the within tension relieving means accomplishes the foregoing low tension travel condition for the belt through the use of the single biasing force of the normally provided retractor spring with the low tension mode being accomplished through a automatically operated means for reacting the force of the single biasing means into a reduced tension effect on the belt.

Having thus described a preferred exemplary embodiment of the tension relieving means for safety belt retractors having a biasing means for normally biasing the associated safety belt storage means toward a belt retracted condition, in accordance with the present invention, it should be understood by those skilled in the art that various modifications, adaptations and alternative instructions thereof may be made within the spirit and scope of the present invention which is defined by the following claims.

I claim:

1. Tension relieving means for safety belt retractors having a safety belt storage means, a safety belt connected thereto and biasing means for normally biasing such belt storage means toward a belt retracted condition producing a first tension in said safety belt when it is protracted to a position of use said tension relieving means comprising:
   means for restricting retractive bias of said biasing means to provide a second tension on said belt of a lower value than that of said first tension due to said biasing means; and
   means for automatically operating said restricting means to a restricting condition only upon a slight retraction of the safety belt following a protraction thereof to any position of use.

2. The tension relieving means of claim 1 comprising:
   means for deactivating said restricting means automatically upon a further retraction of said belt of a given amount following said slight retraction regardless of the amount of protraction of said belt to place said belt in use beyond said given amount.

3. The tension relieving means of claim 1 comprising:
   means for deactivating said restricting means automatically upon a given amount of protraction of said belt beyond its position when initially slightly retracted to operate said restricting means regardless of the position of use of said belt.

4. The tension relieving means of claim 1 comprising:
   means for deactivating said restricting means automatically upon a given amount of retraction or a given amount of protraction of said belt beyond the limits of a predetermined limited extent of travel for said belt under the influence of the reduced retraction tension regardless of the position of use to which said belt is protracted beyond said given amount of retraction.

5. The tension relieving means of claim 1 wherein said means for restricting retractive bias of said biasing means comprises:
   reactive means engageable with said storage means and portions of said belt protracted therefrom for directing some of the retractive force of said biasing means laterally against said belt portions.

6. The tension relieving means of claim 5 wherein said reactive means further comprises:
   ratchet means mounted to and movable with said storage means under the bias of said biasing means;
   tension arm means pivotally mounted on said retractor and having a belt contacting end for laterally engaging said portions of said belt protracted beyond said given amount of retraction from said storage means; and
   pawl means pivotally mounted on a portion of said tension arm means opposite said belt contacting end relative to the pivotal axis of the tension arm means whereby the force of the biasing means acting on said storage means acts through said pawl to cause pivoting of said tension arm means laterally against said protracted belt portions when said restricting means is operated to reduce the retractive tensioning effect of said biasing means upon said belt.

7. The tension relieving means of claim 6 wherein:
   said pawl means is provided with a first end for engaging said ratchet means and an opposite abutment end disposed on an opposite side of the pivotal axis of said pawl means relative to said ratchet means engaging end; and
   stop means are provided on said retractor for being engaged by said pawl means abutment end upon a further retraction of said belt of a predetermined amount beyond said slight retraction to pivot said pawl means out of engagement with said ratchet means to restore the full biasing retractive effect of said biasing means upon said belt.

8. Tension relieving means for safety belt retractors having a safety belt storage means, a safety belt connected thereto and biasing means for normally biasing such belt storage means toward a belt retracted condition producing a first tension in said safety belt when it is protracted to a position of use said tension relieving means comprising:
   a tension arm means pivotally mounted to said retractor with a belt contacting end positioned to laterally engage protracted portions of the belt and an opposite pawl mounting end;
   a pawl means pivotally mounted to said tension arm means pawl mounting end;

ratchet means associated with said belt storage means for movement therewith under the action of said biasing means; and means for operating said pawl means into engagement with said ratchet means whereby the biasing force of said biasing means acts through said ratchet means and pawl means to pivot said tension arm means belt contacting end into lateral engagement with said belt, the resultant being a second retractive tension on said belt of a lower value than that of said first tension.

9. The tension relieving means of claim 8 wherein said operating means comprises:

means responsive to a slight retractive movement of the protracted belt to operate said pawl.

10. The tension relieving means of claim 8 wherein said operating means comprises:

means responsive to a retractive or protractive movement of the belt beyond the limits of a predetermined limited extent of travel of said belt following said slight retractive movement to deactivate said pawl means.

11. The tension relieving means of claim 8 wherein:

the distance from the belt contacting end of said tension arm means to the arm pivotal axis thereof is considerably greater than the distance from the pivotal mounting axis of said pawl on said pawl mounting is to said arm pivotal axis.

12. The tension relieving means of claim 8 wherein:

means are provided for pivoting said pawl out of engagement with said ratchet means upon a retractive movement of said belt beyond a predetermined amount.

13. Tension relieving means for safety belt retractors having a safety belt storage means, a safety belt connected thereto and biasing means for normally biasing such belt storage means toward a belt retracted condition producing a first tension in said safety belt when it is protracted, said tension relieving means comprising:

belt engaging means for engaging portions of said belt protracted relative to said belt storage means;

pawl means movably mounted upon a portion of said belt engaging means;

force transmitting means for transmitting the force of said biasing means, tending to retract said belt, to said pawl when said pawl engages with said transmitting means;

means responsive to belt movement for allowing said pawl to engage said force transmitting means on a slight retractive movement of a protracted belt; and means for movably mounting said belt engaging means whereby the force of said biasing means acting through said pawl causes said belt engaging means to react against said portions of said belt and produce a low tensioning of said belt.

14. In a safety belt retractor having a webbing storage means having a safety belt webbing connected thereto, dual tension retraction means for applying either of two selectable magnitudes of tension on said webbing in a webbing retraction direction in association with said webbing storage means in response to a predetermined manipulation of said webbing relative to said storage means, the improvement comprising the provision of:

means responsive to both protractive and retractive movements of said webbing of a predetermined amount under the tension of the lower one of said magnitudes of tension for selecting the application of the other of said magnitudes of tension when said movements exceed said predetermined amounts unrelated to the amount of webbing protracted from said webbing storage means beyond said predetermined amount of retractive movement.

15. In a safety belt retractor having a webbing storage means and a safety belt webbing connected thereto, the improvement comprising the provision of:

dual tension retraction means comprising a single retraction spring, means for applying a first value of tension on said webbing in a retraction direction by said spring and means for applying a second lower value of tension on said webbing in a retraction direction by said spring after protraction of said webbing to any position of use only by a predetermined retractive movement of said webbing when said webbing has reached said any position of use.

16. In a safety belt retractor having a webbing storage means and a safety belt webbing connected thereto, the improvement comprising the provision of:

dual tension retraction means comprising a single retraction spring, means for applying a first value of tension on said webbing in a retraction direction by said spring and means for applying a second lower value of tension on said webbing in a retraction direction by said spring only by a predetermined restractive movement of said webbing when said webbing is placed in any desired position of use; and means responsive to both a protraction and a retraction movement of said webbing of a predetermined amount to deactivate said means for applying a second lower value of tension.

* * * * *

Disclaimer 4,081,152.—*Cyril Henderson*, Woodland Hills, Calif. DUAL TENSION RETRACTOR. Patent dated Mar. 28, 1978. Disclaimer filed May 30, 1978, by the assignee, *American Safety Equipment Corporation.*

The term of this patent subsequent to May 31, 1994, has been disclaimed.
 [*Official Gazette July 18, 1978.*]